March 4, 1952
E. P. EMBREE ET AL
2,587,714
CROP DUSTING MACHINE
Filed June 25, 1949
3 Sheets-Sheet 2
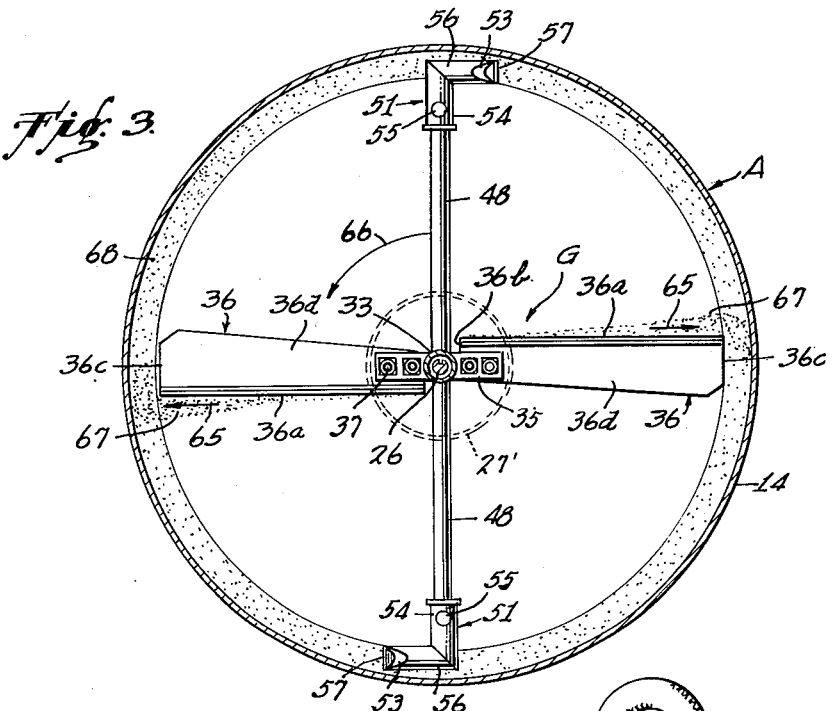
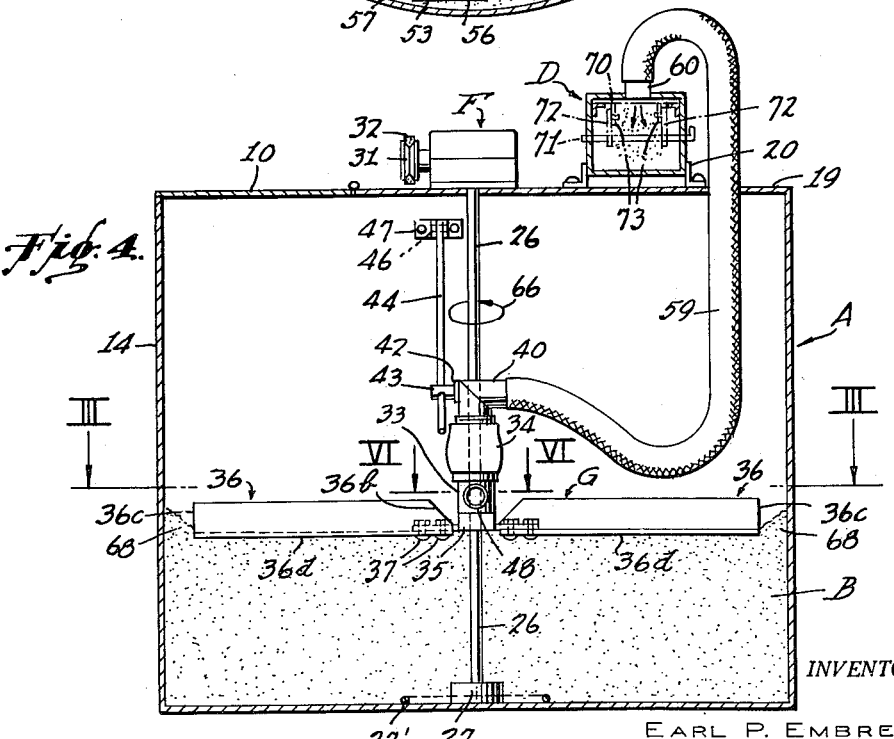
INVENTORS
EARL P. EMBREE
DONALD C. SCHMITTEN
BY Munn, Liddy & Glaccum
ATTORNEYS March 4, 1952  E. P. EMBREE ET AL  2,587,714
CROP DUSTING MACHINE
Filed June 25, 1949  3 Sheets-Sheet 3
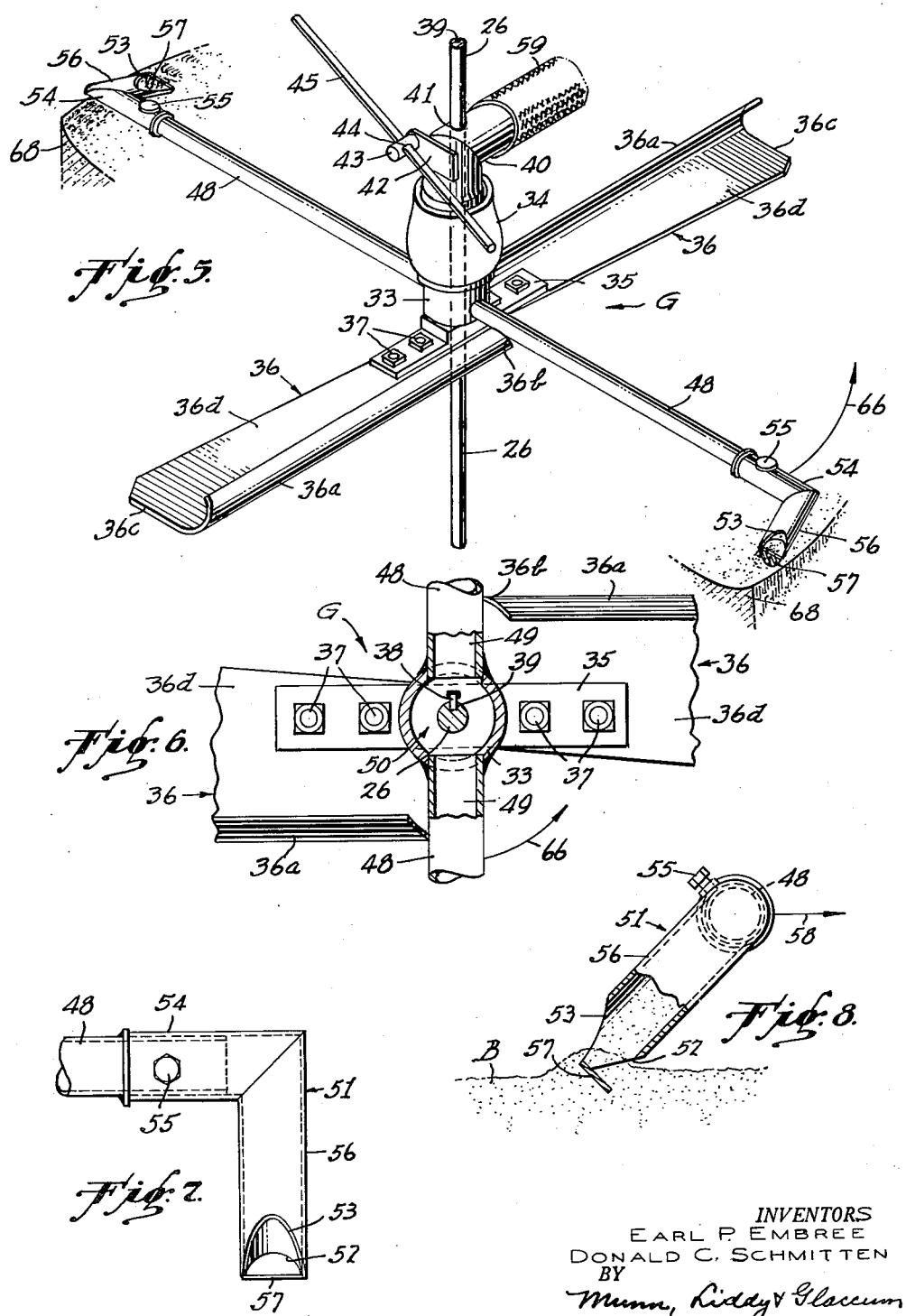
INVENTORS
EARL P. EMBREE
DONALD C. SCHMITTEN
BY
Munn, Liddy & Glaccum
ATTORNEYS Patented Mar. 4, 1952

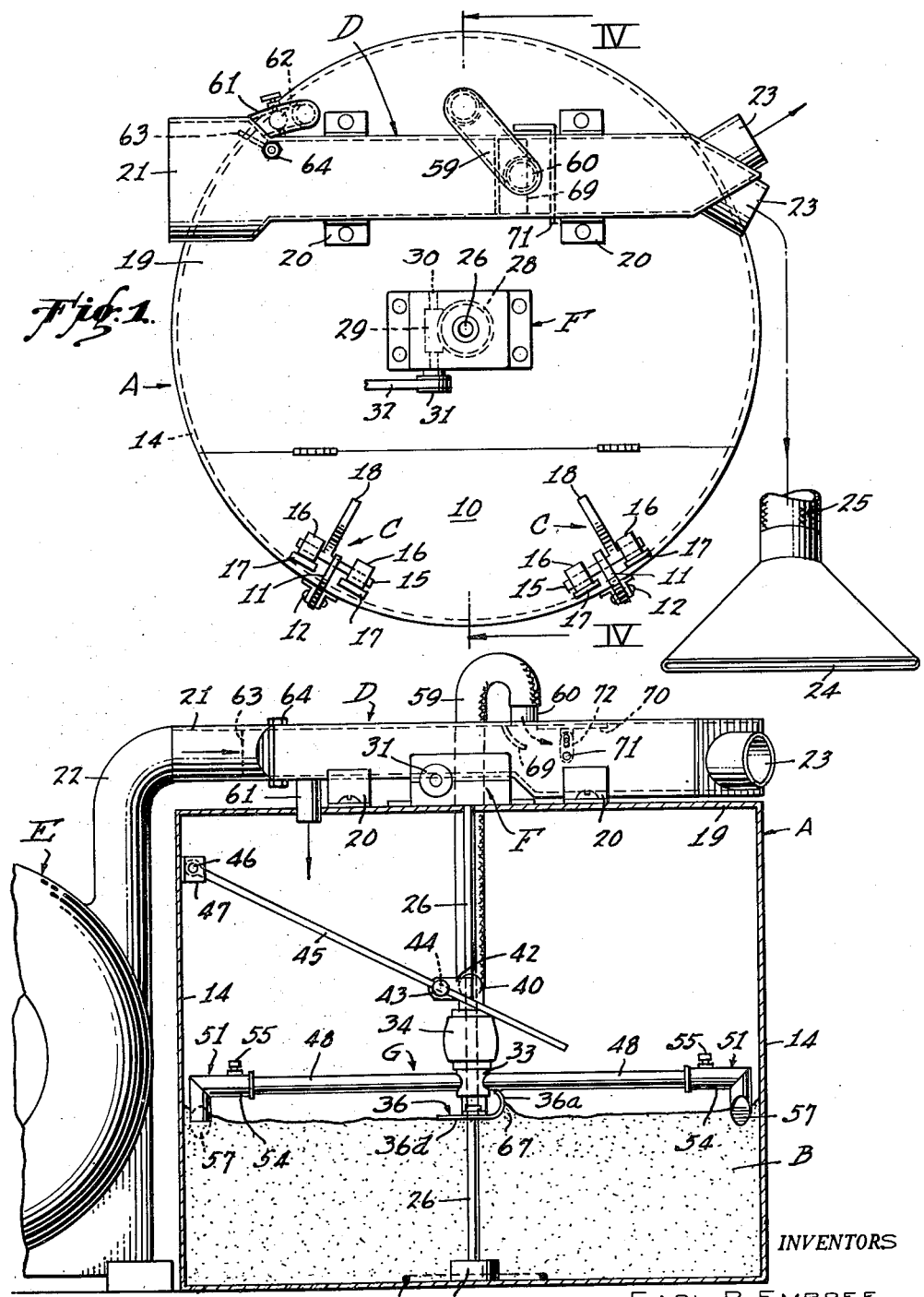

2,587,714

UNITED STATES PATENT OFFICE 2,587,714

CROP-DUSTING MACHINE

Earl P. Embree, San Leandro, Calif., and
Donald C. Schmitten, Chelan, Wash.

Application June 25, 1949, Serial No. 101,294

8 Claims. (Cl. 43—148)

The present invention relates to improvements in a crop-dusting machine. It consists of the combinations, constructions, and arrangement of parts, as hereinafter described and claimed.

In the art of dusting crops with insecticide powder, those classes of machines that employ mechanical devices alone for conveying the powder from a storage container are quite unsatisfactory. For instance, screw-type conveyors will cut a bore through a body of the powder. The powder tends to pack and will not flow freely into the spaces between the blades of such a conveyor. When using agitator blades, much difficulty is experienced in converting and maintaining the powder into a finely-divided dust-like formation. This is due principally to the high specific gravity of the insecticide powder and the tendency for the dust to settle rapidly.

Accordingly, an object of our invention is to provide a crop-dusting machine that will convert insecticide powder into finely-divided dust, and which will convey this dust efficiently to points of discharge upon the crops being treated.

Generally speaking, we provide an air stream, which flows to the points of discharge. Part of the air is by-passed through the container in which the powder is stored. The powder is injected into this by-passed air stream, and the latter is conveyed back to the main air stream.

More specifically, suction nozzles are disposed in the powder-holding container and are disposed for withdrawing the insecticide powder, as required. Further, positive pressure in excess of atmospheric is introduced into the container for forcing the powder through the nozzles. The powder is directed to the nozzles by a rotatable impeller, which further serves to limit the penetration of the nozzles into the powder.

Other objects and advantages will appear as the specification continues. The novel features of the invention will be set forth in the claims hereunto appended.

For a better understanding of our invention, reference should be had to the accompanying drawings, forming part of this application, in which:

Figure 1 is a top plan view of our crop-dusting machine;

Figure 2 is a side elevation thereof, partly in section;

Figure 3 is a horizontal sectional view taken along the line III—III of Figure 4;

Figure 4 is a transverse vertical sectional view taken along the line IV—IV of Figure 1;

Figure 5 is an isomeric view of our impeller;

Figure 6 is an enlarged horizontal sectional view taken along the line VI—VI of Figure 4;

Figure 7 is a top plan view of one of our nozzles; and

Figure 8 is an end view of the same nozzle, partly in section, disclosing it being advanced through the insecticide powder.

While we have shown only the preferred form of our invention, it should be understood that various changes, or modifications, may be made within the scope of the annexed claims without departing from the spirit thereof.

Detailed description

In carrying our invention into practice, we provide a container indicated generally at A, which is adapted to hold insecticide powder B. This container is pressure-tight, and has a hinged lid 10, which may be raised for allowing the powder to be introduced into the container. Clamps C are employed for retaining the lid in closed position.

These clamps include levers 11 having their lower ends hinged at 12 to the exterior of the annular wall 14 of the container. The upper ends of these levers rotatably carry rods 15 having eccentrics 16 secured thereto. These eccentrics engage behind lugs 17 on the lid 10 and force the latter tightly closed when handles 18, which are integral with the rods 15, are swung toward the lid, as in Figure 1.

The container A has a main air conduit D mounted across its cover wall 19 by brackets 20. The inlet end 21 of this conduit is connected to an air outlet pipe 22 of a conventional air blower E. The forward end of the conduit D has branch conduits 23 communicating therewith. In Figure 1, we show a delivery nozzle 24, which is connected to one of the branch conduits 23 by a flexible hose 25. It will be understood, of course, that the hose has sufficient length to extend to the place where the powder is to be discharged upon the crop. Likewise, the other branch conduit 23 is adapted to be connected to a flexible hose leading to another delivery nozzle.

As illustrated in Figures 2 and 4, a vertically-disposed drive shaft 26 is mounted in the container A. The lower end of this shaft is supported in a thrust bearing 27, while its upper end projects into and is coupled to a speed reduction unit designated generally at F. It will be appreciated that the reduction unit F may be of any conventional construction. For the purpose of illustration, we have disclosed a worm gear 28 in Figure 1, which is secured to the shaft 26, and meshes with a worm 29. The latter is mounted on a shaft 30, which is driven by a pulley 31 and belt 32. Any other suitable drive may be employed for rotating the shaft 26.

An impeller indicated generally at G is arranged in the container A and is rotated by the drive shaft 26. This impeller includes a cup-shaped hub 33 that turns in a non-rotatable hollow bowl 34. The hub 33 has a bracket 35 fixed thereto so as to rotate therewith. Blades designated generally at 36 are secured to the bracket 35 by bolts 37, or other suitable fastening means. These blades ride on the surface of the insecticide powder B in the container A, as clearly shown in Figures 2 and 4.

Referring to Figure 6, it will be noted that a key 38 is anchored to the bracket 35 and slides in a vertical key-way 39 provided in the drive shaft 26. Thus rotation of this drive shaft will turn the bracket 35 and its blades 36. However, the bracket and blades may be raised or lowered on the drive shaft, depending upon the level of the powder in the container.

The bowl 34 has an elbow 40 communicating therewith. The elbow is provided with an opening 41 through which the shaft 26 extends (see Figure 5). This elbow is fixed to the bowl so as to rise and fall therewith. In order to restrain the elbow and bowl from rotating, we make use of an arm 42, which is welded to the elbow. This arm has a stud 43 rotatably connected thereto, in which an aperture 44 is fashioned. A rod 45 has its upper end hinged at 46 to brackets 47, the latter being anchored to the interior of the annular wall 14 of the container. This rod slidably projects through the aperture 44. The rod 45 holds the arm 42 against turning, and thereby restrains the elbow 40 and bowl 34 from rotating. However, the stud 43 is slidable on the rod 45, and thus the bowl 34 may be raised or lowered on the drive shaft 26.

The impeller G further includes tubular arms 48, which are spaced between the blades 36. The inner ends of these arms are secured to the cup-shaped hub 33. The bores 49 of the tubular arms 48 communicate with the hollow interior 50 of the hub 33 (see Figure 6).

The outer ends of the tubular arms 48 are provided with intake nozzles designated generally at 51. As the specification continues, the fact will be made clear that suction is established in these nozzles so as to draw the insecticide powder B into the interiors thereof. Also, positive pressure in excess of atmospheric, is maintained in the container A, and this air enters inlet ports 52 and 53 provided in the nozzles and lifts the powder into the nozzles.

Generally speaking, the nozzles 51 are L-shaped and are fashioned from tubing. The horizontal legs 54 of the nozzles are telescoped over the outer ends of the tubular arms 48 and are held in adjusted position thereon by set-screws 55. The remaining legs 56 of the nozzles are adjustable in vertical planes about the outer ends of the tubular arms.

In Figures 3, 5, 7 and 8, we show the inlet ends of the nozzles 51 as having blades 57 fixed thereto beyond the inlet ports 52—53. These nozzles may be adjusted so as to present their legs 56 in an inclined relation, with their blades 57 penetrating into the upper portion of the body of powder B.

It is obvious from Figure 8 that when the nozzles are moved forwardly, as suggested by the arrow 58, the blades 57 will dig into the powder B, causing the latter to move upwardly along the uppermost surfaces of the blades and through the port 52. The suction in the nozzles will become active on the powder thus lifted and will draw the powder into the nozzles. At the same time, positive pressure in the container A, in seeking an outlet, will escape through the ports 52 and 53 and will aid in forcing the powder along the interiors of the nozzles 51 and the tubular arms 48.

This powder will flow from the bores 49 of the tubular arms into the hollow interior 50 of the cup-shaped hub 33. The latter opens into the hollow of the bowl 34. In turn, this bowl communicates with the elbow 40. The powder is discharged from the elbow into a flexible tube 59. The latter extends upwardly through the cover wall 19 and has its upper end connected to a stub-pipe 60, which discharges the powder into the conduit D (see Figure 4).

As previously stated, positive pressure is maintained in the container A in excess of atmospheric. This is accomplished by means of an air delivery pipe 61, which communicates with the main air conduit D (see Figure 1) and extends through the cover wall 19 of the container (see Figure 2). A suitable valve 62 is arranged in the pipe 61 so that the flow of air therethrough may be regulated. Also, we make use of a swingably-mounted baffle 63, which is movable relative to the inlet end of the pipe 61. This baffle is adjustable to direct the desired proportion of air into the pipe 61, and is held in adjusted position by a clamp bolt 64.

Returning now to the impeller G, it will be noted that its blades 36 have their leading edges 36a disposed non-radially with respect to the drive shaft 26. These leading edges are curved upwardly in transverse section and sweep backwardly from the inner ends 36b of the blades to the outer ends 36c thereof, with respect to radii from the shaft 26. This construction causes the leading edges of the blades to crowd the powder B toward the annular wall 14 of the container, as suggested by the arrows 65 in Figure 3, when the impeller is rotated in the direction of the arrows 66 (see Figures 3 to 6, inclusive).

The outer ends 36c of the blades terminate short of the container wall 14, as clearly shown in Figures 3 and 4. The ridges 67 of the insecticide powder being crowded toward the wall 14 by the blades form an annular ridge 68 of powder along the interior of the container wall as the powder is discharged over the outer ends 36c of the blades.

It will be noted that the inlet ends of the intake nozzles 51 are positioned adjacent to the annular wall 14 of the container and dig into the ridge 68 of powder as these nozzles are advanced. The flat portions 36d of the blades 36 ride over the surface of the powder B and thus limit the depth of penetration of the intake nozzles into the powder. Of course, these nozzles may be adjusted by means of the set-screws 55 to vary the depth of penetration into the powder. The curved leading edges 36a of the blades will cause the latter to cam the blades to the top of the powder as they are rotated. The entire impeller unit G will gravitate along the shaft 26 as the level of the powder is lowered in the container. A ring 27' is welded to the upper surface of the bottom of the container and surrounds the bearing 27. The purpose of this ring is to prevent the heads of the bolts 37 from scraping on the bottom of the container when the impeller G reaches its lowermost position.

In Figures 1 and 2, we illustrate a curved baffle 69 disposed on the interior of the main air conduit D just rearwardly of the stub pipe 60. This baffle directs the flow of air in the conduit D away from the bottom end of the pipe 60. As the air stream flows forwardly in the main conduit D toward the branch conduits 23, suction is created in the tube 59. This suction will aid in lifting the powder through the nozzles 51, tubular arms 48, cup-shaped hub 33, bowl 34 and tube 59.

A slidably-mounted gate valve 70 is arranged in the conduit D and is adjustable relative to the outlet end of the stub pipe 60. For the purpose of adjusting this gate valve, we have provided a rock shaft 71 having slotted arms 72 fixed thereto, which engage with lugs 73 secured to the gate valve (see Figures 2 and 4). The cross-sectional area of the conduit D is increased in the region of and just ahead of the baffle 69 so as to reduce the prevailing pressure in the conduit.

Summary of operation

Our crop-dusting machine is adapted to be mounted on a suitable chassis (not shown) in order that it may be moved through orchards or fields when crops are being grown. The flexible hoses 25 are sufficiently long to allow the delivery nozzles 24 to extend to desired points of discharge for the insecticide powder B onto the crops.

When the powder is to be dispensed for treating the crops, the air blower E is set in operation. This will force an air stream through the main conduit D for flow to the delivery nozzles 24. Part of the air will be by-passed through the delivery pipe 61 and will build up positive pressure in the container A in excess of atmospheric. The proportion of air entering the container will depend upon the setting of the valve 62 and the adjustment of the baffle 63.

The speed reduction unit F is driven at the proper speed, which will result in rotating the impeller G. The blades 36 of the impeller will crowd the upper part of the body of insecticide powder B toward the annular wall 14 of the container A, forming the ridge 68 of powder along the inner surface of this wall. The inlet nozzles 51 will penetrate into the annular ridge 68 of the powder.

As the air stream flows through the main conduit D, suction will be created in the pipe 60 and the flexible tube 59. Accordingly, the insecticide powder will be drawn by the suction through the nozzles 51, tubular arms 48, cup-shaped hub 33, bowl 34 and elbow 40. Moreover, the air in the container will flow along this same passageway and will aid in moving the powder and forcing it to the delivery nozzles 24. The entire impeller unit G will descend as the insecticide powder is withdrawn from the container. Regulation of the gate valve 70 will control the discharge of the powder into the main air conduit D.

Broadly speaking, the nozzles 51, tubular arms 48, cup-shaped hub 33, bowl 34, elbow 40 and tube 59 define a "tubular passageway" for the insecticide powder. It is obvious that the device could be used for broadcast planting of seed such as rice, different types of grains, grass seeds, etc.

We claim:

1. In a material-dispensing machine: a container adapted to hold material to be dispensed; the container including an annular wall; a rotatable impeller disposed in the container and having blades movable over the surface of the material; the blades having non-radial leading edges disposed to scrape material toward the annular wall of the container when the impeller is rotated; tubular arms connected to the impeller and having intake nozzles with inlet ends disposed for movement through the material directed toward the annular wall of the container; means for moving the material through the inlets of the nozzles and into the tubular arms; and means for rotating the impeller to move its blades and tubular arms.

2. In a material-dispensing machine: a container adapted to hold material to be dispensed; the container including an annular wall; a rotatable impeller disposed in the container and having blades movable over the surface of the material; the blades having non-radial leading edges disposed to scrape material toward the annular wall of the container when the impeller is rotated; tubular arms connected to the impeller and having intake nozzles with inlet ends disposed for movement through the material directed toward the annular wall of the container; means for moving the material through the inlets of the nozzles and into the tubular arms; means for rotating the impeller to move its blades and tubular arms; and a tubular passageway extending into the container and connected to the interior of the arms to convey the material therefrom.

3. In a material-dispensing machine: a container adapted to hold material to be dispensed; the container including an annular wall; a rotatable impeller disposed in the container and having blades movable over the surface of the material; the blades having non-radial leading edges disposed to scrape material toward the annular wall of the container when the impeller is rotated; tubular arms connected to the impeller and having intake nozzles with inlet ends disposed for movement through the material directed toward the annular wall of the container; means for moving the material through the inlets of the nozzles and into the tubular arms; means for rotating the impeller to move its blades and tubular arms; and nozzles being adjustable relative to the tubular arms to change the depth of penetration of the inlet ends of the nozzles into the material; and means for retaining the nozzles in adjusted positions with respect to the arms.

4. In a material-dispensing machine: a container adapted to hold material to be dispensed; the container including an annular upright wall; a rotatable impeller disposed in the container and having a blade movable over the surface of the material; the blade being disposed to scoop the material toward the annular wall of the container when the impeller is rotated; means for rotating the impeller; an intake nozzle carried by the impeller and trailing behind the blade; the nozzle having an inlet end movable through the material scooped toward the annular wall of the container; and means for moving air through the nozzle to lift the material into the nozzle.

5. In a material-dispensing machine: a container adapted to hold material to be dispensed; the container including an annular upright wall; a rotatable impeller disposed in the container and having a blade movable over the surface of the material; the blade being disposed to scoop the material toward the annular wall of the container when the impeller is rotated; means for rotating the impeller; an intake nozzle carried by the impeller and trailing behind the blade; the nozzle having an inlet end movable through the material scooped toward the annular wall of the container; and means for moving air through the nozzle to lift the material into the nozzle; the blade having an up-turned leading edge disposed to urge the blade upwardly toward the surface of the material as the blade is rotated.

6. In a material-dispensing machine: a container adapted to hold material to be dispensed; the container including an annular wall; a rotatable and vertically-movable impeller disposed in the container and having a blade movable over the surface of the material; the blade being disposed to scoop the material toward the annular wall of the container when the impeller is rotated; an intake nozzle carried by the impeller and trailing behind the blade; the nozzle having an inlet end movable through the material scooped toward the annular wall of the container; and means for rotating the impeller; the impeller being guided for descending movement as the material is withdrawn, with the blade continuing to move over the surface of the material and the nozzle continuing to move through the scooped material adjacent to the annular wall.

7. In a material-dispensing machine: a container adapted to hold material to be dispensed; the container including an annular wall; a rotatable and vertically-movable impeller disposed in the container and having a blade movable over the surface of the material; the blade being disposed to scoop the material toward the annular wall of the container when the impeller is rotated; an intake nozzle carried by the impeller and trailing behind the blade; the nozzle having an inlet end movable through the material scooped toward the annular wall of the container; and means for rotating the impeller; the impeller being guided for descending movement as the material is withdrawn, with the blade continuing to move over the surface of the material and the nozzle continuing to move through the scooped material adjacent to the annular wall; the blade having an upturned leading edge disposed to urge the blade upwardly toward the surface of the material as the blade is rotated.

8. In a material-dispensing machine: a container adapted to hold material to be dispensed; a rotatable impeller disposed in the container and including a tubular arm forming part of a passageway through which the material may be conveyed from the container; a tubular L-shaped intake nozzle having one leg thereof telescoped relative to the arm and communicating with the interior of the tubular arm; the other leg of the nozzle depending from the arm and being swingable in a substantially vertical plane and adjustable to various depths of penetration into the material; a blade fixed to the lower end of the depending leg to swing and move therewith; this blade being secured in inclined relation with the length of the depending leg and disposed to be drawn through the material to plow and scoop up the material into the nozzle when the impeller is rotatable to move the blade forwardly; the depending leg having ports in the leading and trailing portions thereof immediately above the blade; means for retaining the nozzle and its blade in adjusted position relative to the tubular arm; and means for establishing an updraft through the nozzle and tubular arm to withdraw material scooped up by the blade.

EARL P. EMBREE.
DONALD C. SCHMITTEN.

REFERENCES CITED

The following references are of record in the file of this patent:

UNITED STATES PATENTS

| Number | Name | Date |
|---|---|---|
| 630,613 | Lisk | Aug. 8, 1899 |
| 671,967 | Kiser et al. | Apr. 16, 1901 |
| 1,033,854 | Wenk | July 30, 1912 |
| 1,550,311 | Foster | Aug. 18, 1925 |
| 1,687,545 | Clements | Oct. 26, 1928 |
| 2,202,079 | Ayres | May 28, 1940 |
| 2,443,584 | Root | June 15, 1948 |

FOREIGN PATENTS

| Number | Country | Date |
|---|---|---|
| 840,932 | France | May 8, 1939 |